United States Patent
D'Arco

(10) Patent No.: US 9,717,231 B1
(45) Date of Patent: Aug. 1, 2017

(54) SCENT DISPENSING SYSTEM AND APPARATUS

(71) Applicant: Gabriel D'Arco, Monson, MA (US)

(72) Inventor: Gabriel D'Arco, Monson, MA (US)

( * ) Notice: Subject to any disclaimer, the term of this patent is extended or adjusted under 35 U.S.C. 154(b) by 0 days.

(21) Appl. No.: 14/990,950

(22) Filed: Jan. 8, 2016

(51) Int. Cl.
*A01M 31/00* (2006.01)

(52) U.S. Cl.
CPC .................. *A01M 31/008* (2013.01)

(58) Field of Classification Search
CPC ..... A01M 1/2044; A01M 31/008; A61L 9/04; A61L 9/12; A61L 9/127
USPC ...... 239/6, 34, 36, 37, 44–52; 43/1
See application file for complete search history.

(56) References Cited

U.S. PATENT DOCUMENTS

| | | | | |
|---|---|---|---|---|
| 4,506,806 A | * | 3/1985 | Lincoln | A01M 29/12 119/711 |
| 4,667,430 A | * | 5/1987 | Ziese, Jr. | A01M 31/008 119/711 |
| 4,682,715 A | * | 7/1987 | Reeves | A01M 31/008 222/175 |
| 5,242,111 A | * | 9/1993 | Nakoneczny | A61L 9/127 239/44 |
| 5,555,663 A | * | 9/1996 | Burgeson | A01M 31/008 239/53 |
| 5,906,298 A | * | 5/1999 | Ward | A61L 9/127 222/175 |
| 7,819,293 B1 | * | 10/2010 | O'Connell | A45F 3/20 220/703 |
| 9,185,901 B1 | * | 11/2015 | Arcia | A01M 31/008 |
| 2006/0169793 A1 | * | 8/2006 | Price | A61L 9/14 239/34 |
| 2006/0289668 A1 | * | 12/2006 | Szymczak | A61L 9/12 239/36 |
| 2012/0199664 A1 | * | 8/2012 | Eklund | A61L 9/12 239/34 |
| 2015/0096218 A1 | * | 4/2015 | Burr | A01M 31/008 43/1 |

* cited by examiner

*Primary Examiner* — Darren W Gorman
(74) *Attorney, Agent, or Firm* — Grogan, Tuccillo & Vanderleeden, LLP

(57) ABSTRACT

An apparatus for dispensing scent includes a housing defining a bladder configured to hold a volume of liquid scent, a flexible tube connected to the bladder, the flexible tube having a distal end opposite the bladder, and a wick receivable on the distal end of the tube.

16 Claims, 8 Drawing Sheets

SCENT DISPENSING SYSTEM AND APPARATUS

FIELD OF THE INVENTION

The present invention relates generally to the field of hunting and trapping and, more particularly, to a device for selectively dispensing scent.

BACKGROUND OF THE INVENTION

Hunters of deer and other game animals frequently will rely on some type of animal lure to assist them in tracking and sighting game. Usually, the lure a hunter employs is a scented substance, the odor of which is an animal attractant. Other scented substances likewise are used to mask the natural odors associated with the hunter that would otherwise warn the animal of the hunter's presence thereby hindering the hunter's ability to attract the animal.

Many of the commercially available scented substances are provided in liquid form. Such scents and lures are typically deposited on the ground of into the air by some means as the hunters and trappers walk. For example, rags or pads may be soaked in liquid scent and dragged behind a hunter as he/she walks. These methods, however, are replete with drawbacks. In particular, when dragging a scented rag directly behind a hunter as he/she walks, there is no separation between the scent being applied and the hunter's own scent; they both overlap, leading to contamination between the hunter's scent and the scent being applied, which decreases effectiveness. In addition, the process of setting up for scent dispersion, including taking the rags out of a bag, applying scent to the rags, and attaching the rags to the hunter contribute to cross-contamination.

Moreover, during use, hang-ups, snags and the like are common, making such existing methods and devices cumbersome to use. Frequent stopping to re-soak the rags with scent is also time consuming. Such methods are also not well suited for certain weather conditions or certain terrain features. Finally, because the rags are simply dragged behind a hunter, the area of application is limited to the area behind the hunter; there is not much flexibility in where the scent is dispersed.

In view of the above, there is a need for a scent dispersion system and apparatus that is more efficient than existing methods, minimizes cross-contamination, and allows for more control as to where the scent is dispersed.

SUMMARY OF THE INVENTION

It is an object of the present invention to provide a scent dispensing system.

It is another object of the present invention to provide a scent dispensing system that is more efficient than existing methods.

It is another object of the present invention to provide a scent dispensing system that decreases the likelihood of cross-contamination.

It is another object of the present invention to provide a scent dispensing system that is gives users more control of where the scent is dispensed.

It is another object of the present invention to provide a scent dispensing device capable of functioning as a scent dripper.

These and other objects are achieved by the present invention.

According to an embodiment of the present invention an apparatus for dispensing scent is provided. The apparatus includes a housing defining a bladder configured to hold a volume of liquid scent, a flexible tube connected to the bladder, the flexible tube having a distal end opposite the bladder, and a wick receivable on the distal end of the tube.

In another embodiment, a scent-dispensing device is provided. The device includes a squeezable bladder configured to hold a volume of liquid scent, the bladder including an inlet and an outlet, a flexible tube connected to the bladder and in fluid communication with the outlet, the flexible tube having a distal end opposite the bladder, and a wick receivable on the distal end of the tube.

In an embodiment, a method of applying liquid scent is provided. The method includes the steps of filling a scent-dispensing device with said liquid scent, the device including a bladder and a tube extending from the bladder, selectively positioning a distal end of the tube, and squeezing the bladder to urge the liquid scent into the tube and out of the distal end of the tube.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
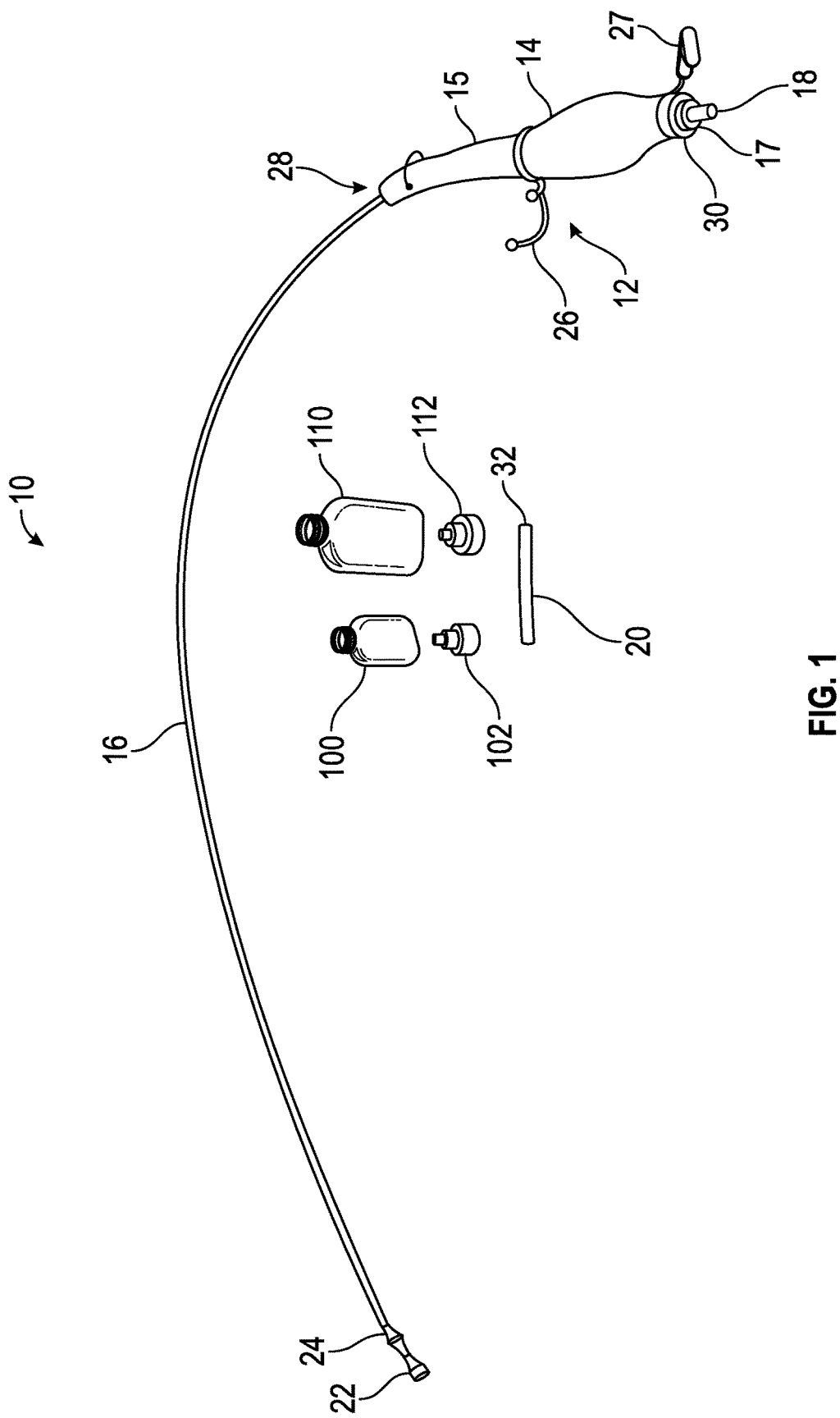
FIG. 1 is a perspective view of a scent dispensing system according to an embodiment of the present invention.

Referring to FIG. 1, the present invention relates to a scent dispensing system 10 for dispensing a scented liquid such as an animal attractant. The scent dispensing system 10 includes a scent dispensing apparatus 12, a small-capacity refilling container 100 having a refilling cap 102 and a large-capacity refilling container 110 having a refilling cap 112. Operation of the scent dispensing system 10 is described in detail below.

Figure 2:
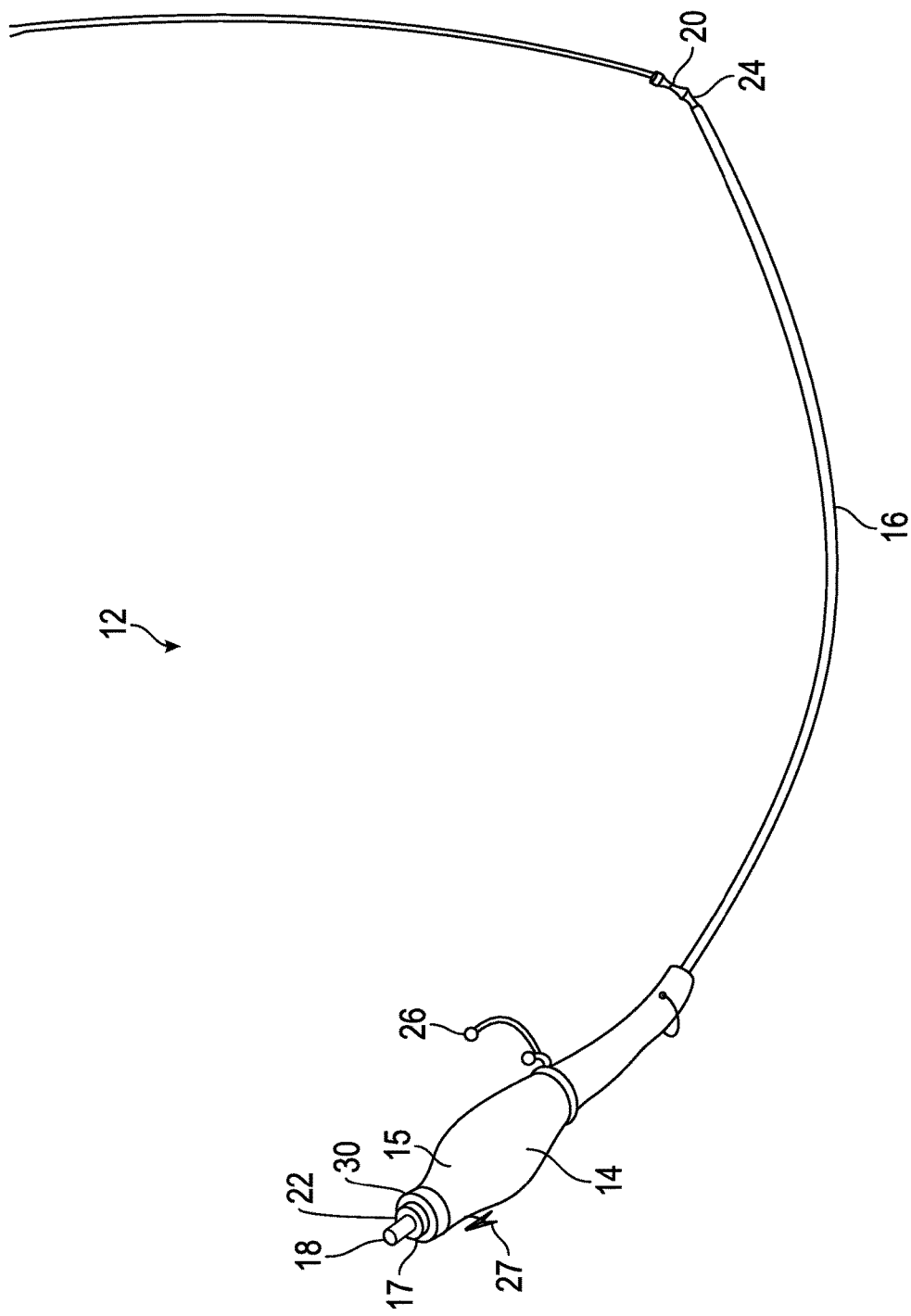
FIG. 2 is a perspective view of a scent dispensing device of the scent dispensing system of FIG. 1.
Figure 3:
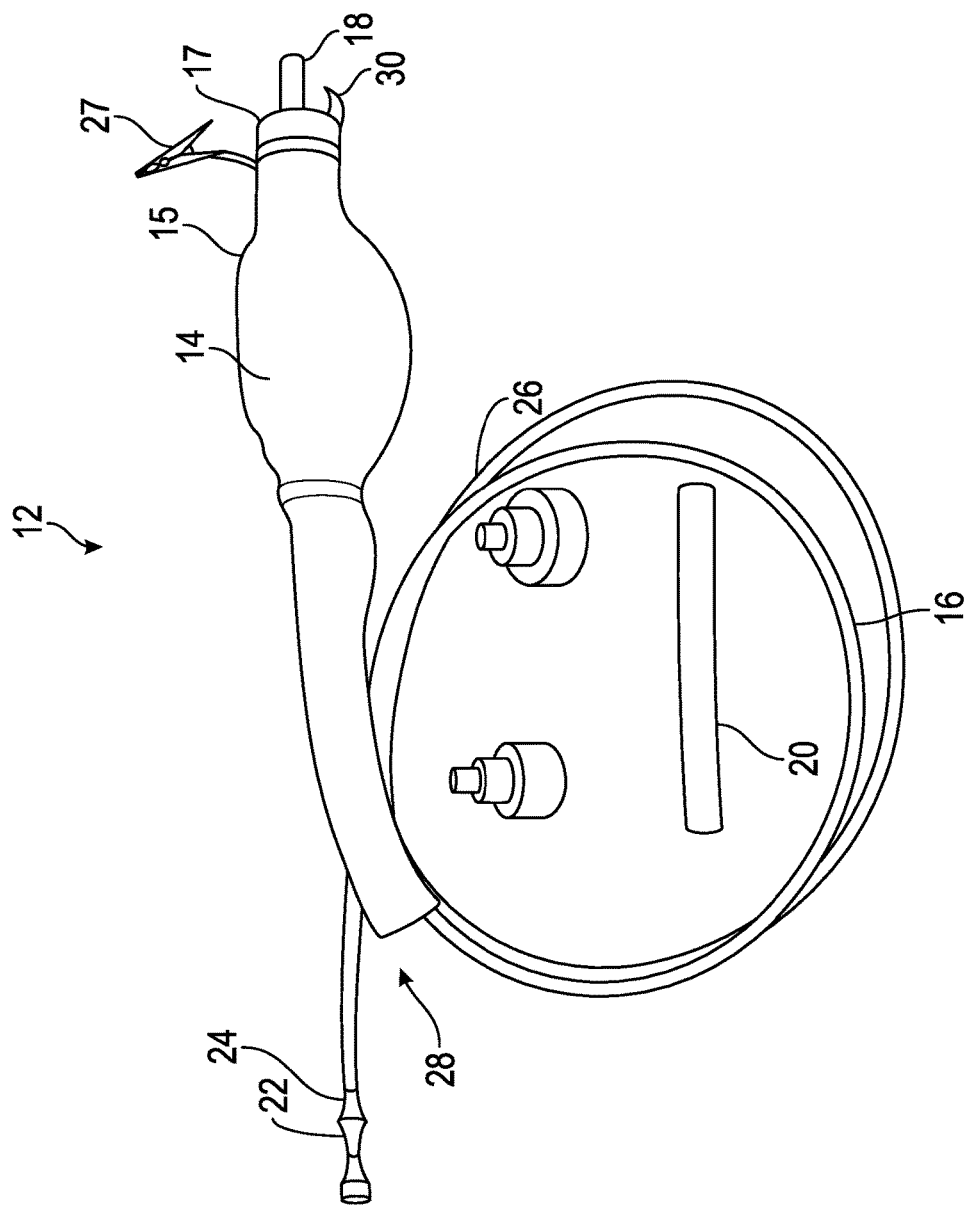
FIG. 3 is another perspective view of the scent dispensing device of FIG. 2, illustrating a stowed position.

Turning now to FIGS. 1-3, the scent dispensing apparatus 12 includes a primer bulb or bladder 14 contained within or otherwise defining a squeezable housing 15, and a flexible tube 16 extending from the bladder 14. The bladder 14 includes an inlet 17 at one end therefore configured to receive a cap 18 for selectively sealing off the inlet, and an outlet (not shown) at the opposite end thereof to which the tube is connected. The outlet in the bladder 14 provides for fluid communication between the bladder 14 and the tube 16. The distal end of the flexible tube 16 opposite the bladder 14 is configured to receive one of a wick 20 and an end cap 22, as discussed in detail hereinafter. In connection with this, in an embodiment, the distal end of the flexible tube 16 may include a coupling 24 configured to enable the selective attachment of either the wick 20 or the end cap 22 to the tube 16. The coupling 24 may include a male threaded portion for receiving a complimentary female threaded portion of the wick 20 or end cap 22 so that the wick 20 or end cap 22 may be securely coupled to the flexible tube 16, as discussed in detail below. In an embodiment, the tube 16 is approximately 5 feet in length and the bladder 14 has an approximately 4 ounce capacity, although other tube lengths and bladder capacities may also be utilized without departing from the broader aspects of the present invention.

Importantly, the flexible tube 16 is flexible enough to allow a user to manipulate the orientation and shape of the tube as desired, but rigid enough so that once positioned in the desired orientation/shape it will maintain such shape. For example, in an embodiment the flexible tube 16 may include a hollow plastic tube and a malleable metal wire within a heat-shrink casing. The wire imparts a degree of stiffness to the plastic tube, allowing the tube 16 to be selectively positioned by a user and maintained in a variety of shapes and positions. For example, as illustrated in FIGS. 1 and 2, the tube 16 may placed in an extended position by a user. Importantly, the wire within the casing maintains the tube 16 in this position until it is reconfigured by a user. As shown in FIG. 3, the tube 16 can alternatively be coiled up such as for storage or transporting. Again, the wire within the casing helps maintain the tube 16 in this coiled position until reconfigured by a user.

With further reference to FIGS. 1-3, the scent dispensing device 12 may also include a retaining strap 26 connected to the housing 15. The retaining strap 26, like the wire portion of the tube, is sufficiently malleable to allow a user to manipulate its shape and position, but stiff enough to maintain its shape once configured by a user. The retaining strap 26 is utilized to hold the tube 16 in a stowed or coiled position for storage or transport, as shown in FIG. 3. For example, during storage or transport, the tube 16 may be coiled, as illustrated. The strap 26 may then be wrapped around the coiled tube to hold the tube 16 close to the bladder 14 in a compact manner. When it is desired to use the device 12, the strap 26 may simply be uncoiled and the tube 16 extended. Moreover, the dispensing device 12 may also include a spring clip 27 mounted to the bladder 14 or housing 15 adjacent to the end cap 18. The spring clip 27 is provided to allow a user to clip the device 12 to a branch or a users belt, as discussed hereinafter.

As best shown in FIG. 3, the housing 15 or bladder 14 may also be configured with a recess 28 configured to receive the wick 20 therein, when not in use. The recess 28 may be formed as a slot in the bottom of the housing adjacent to the tube 16, and is preferably sized and shaped to closely receive the wick 20 therein. The end of the bladder 14 or housing 15 adjacent to the end cap 18 preferably includes a male threaded stud 30. The stud 30 is configured to threadedly receive the end cap 22 of the tube 16 after it is removed so that it is not lost or misplaced, and so that the wick 20 may be installed on the tube 16. As further shown in FIG. 3, the wick 20 includes an absorbent body portion and a female threaded coupling portion 32 that is configured to mate with the male threaded portion of the coupling 24 of the tube 16. The cap is similarly configured with a female threaded coupling portion to enable attachment to the coupling 24 of the tube 16. In an embodiment, the wick may be formed from cotton or felt, although other absorbent materials known in the art may also be utilized without departing from the broader aspects of the present invention.

Figure 4:
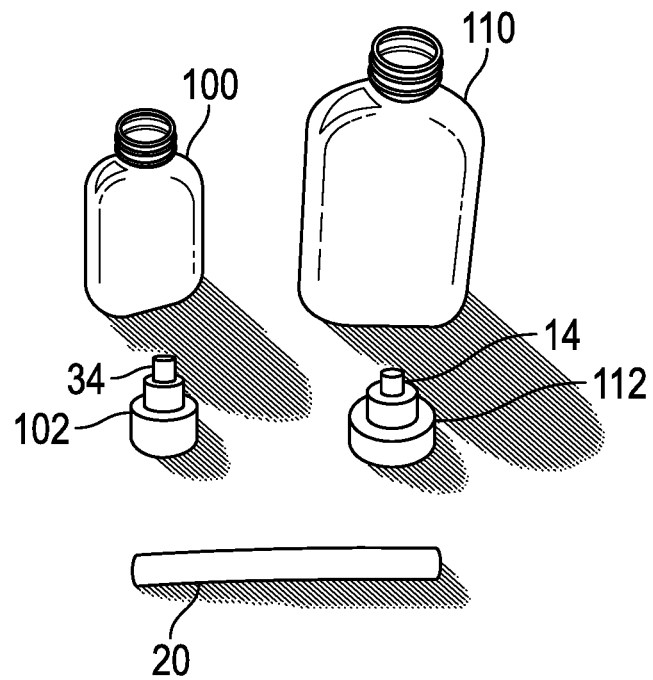
FIG. 4 is a perspective view of refill bottles of the scent dispensing system of FIG. 1.
Figure 5:
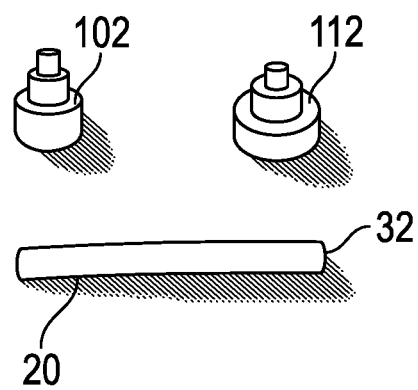
FIG. 5 is a perspective view of caps of the refill bottles of FIG. 4.
Figure 6:
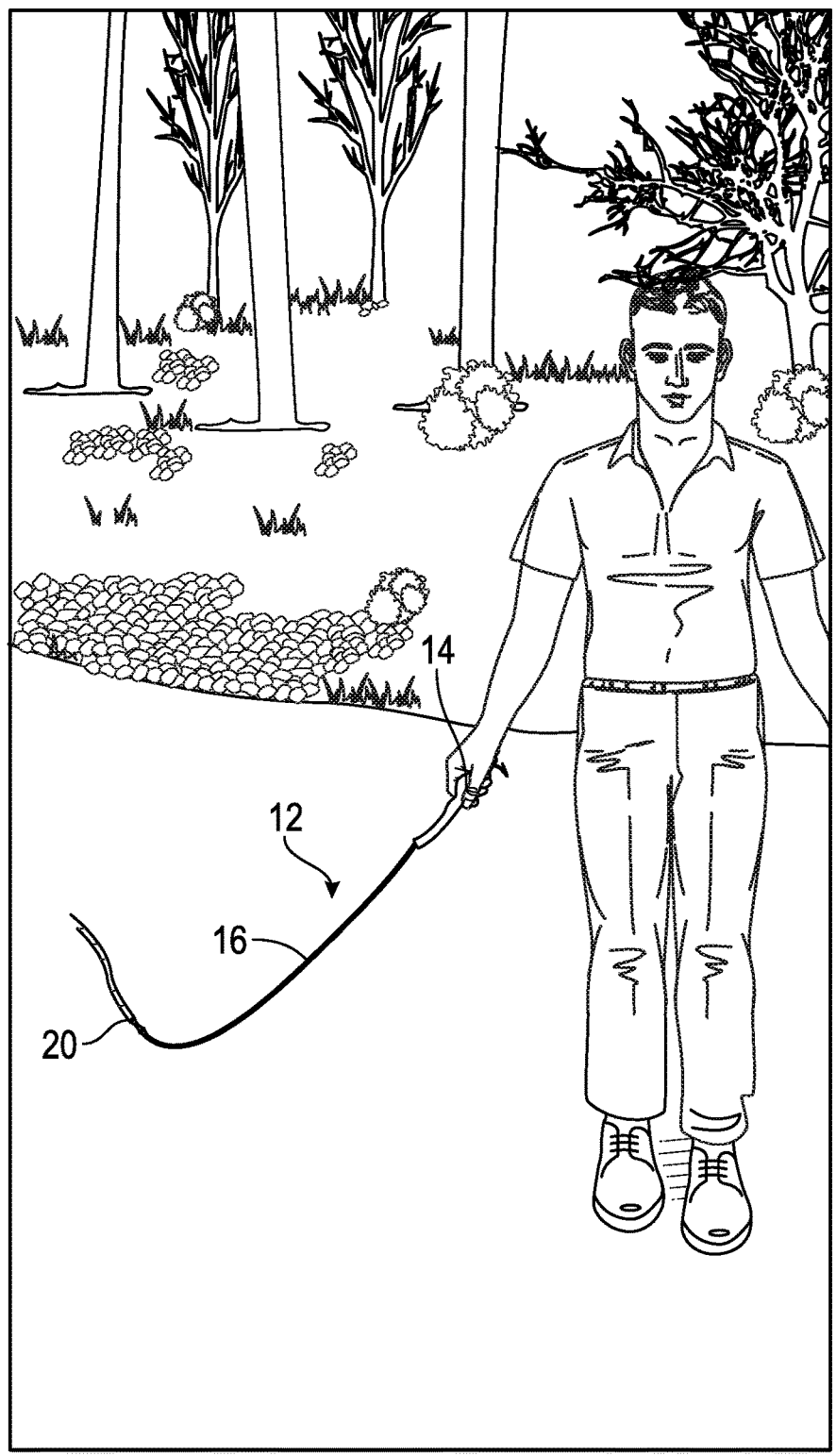
FIG. 6 is a perspective view of the scent dispensing device of FIG. 2, illustrating the dispensing of scent.
Figure 7:
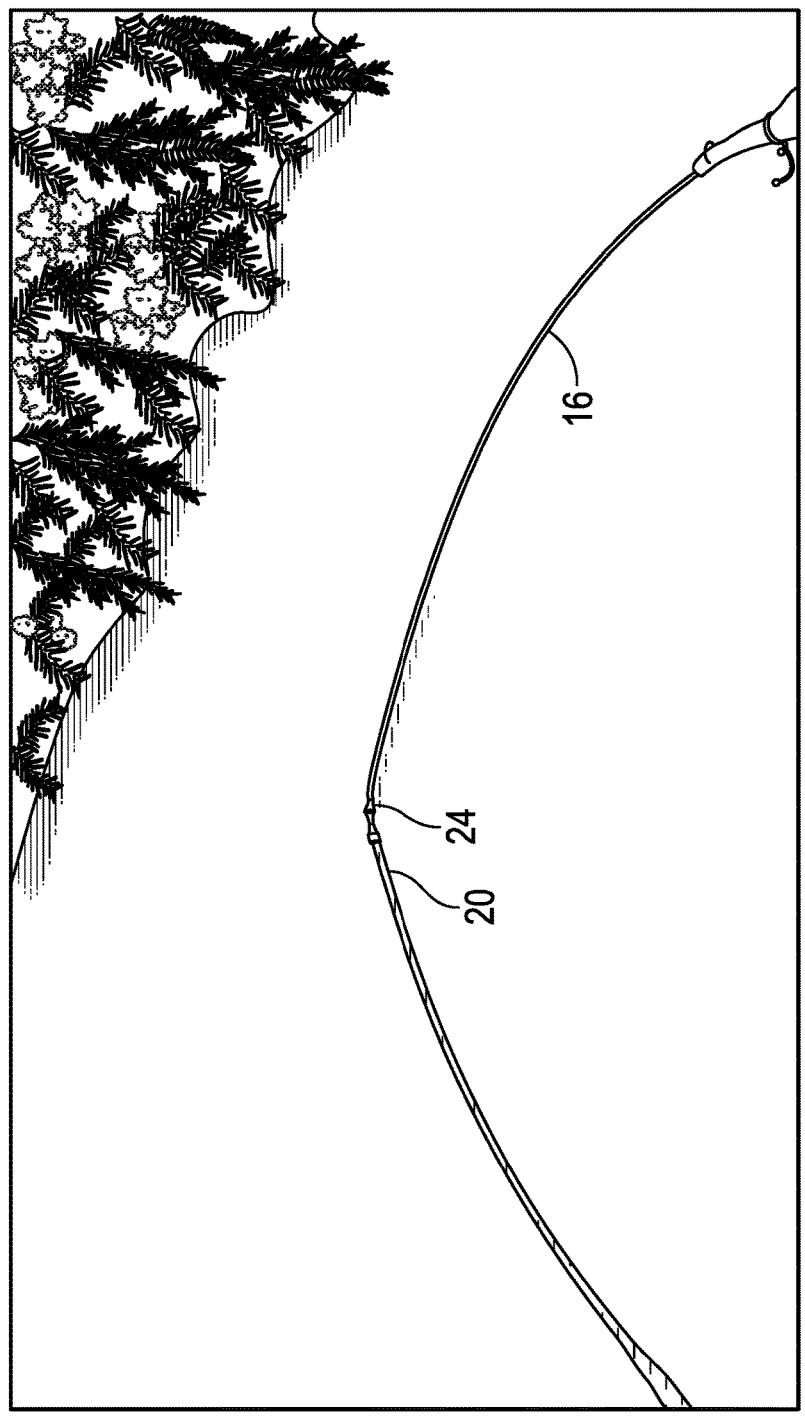
FIG. 7 is an enlarged, perspective view of an extension tube and applicator tip of the scent dispensing device of FIG. 2.
Figure 8:
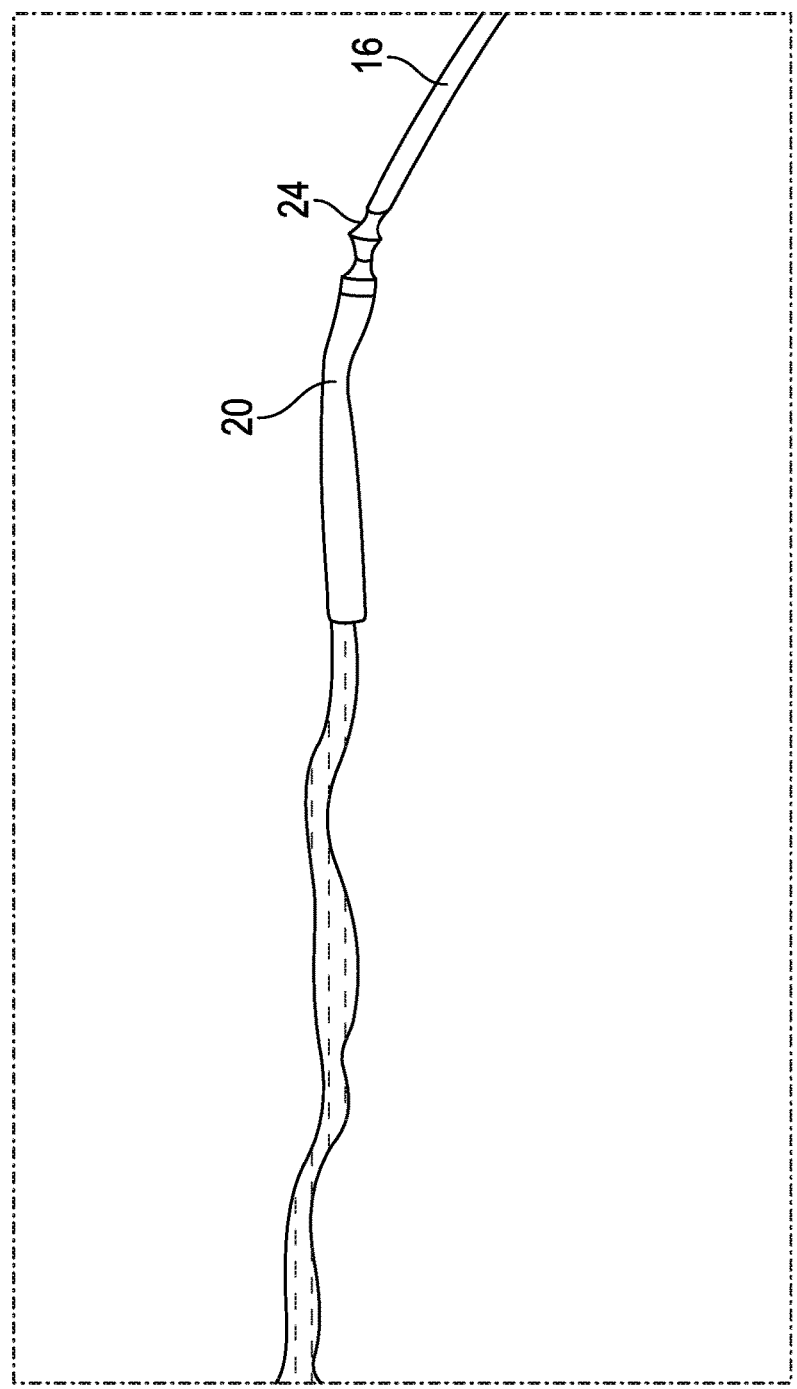
FIG. 8 is an enlarged, perspective view of the applicator tip of the scent dispensing device of FIG. 2.

Turning now to FIGS. 4 and 5, the refilling bottles 100, 110 and caps 102, 112 are illustrated. Each of the bottles 100, 110 includes a body portion and a neck portion defining an open top. The neck portions of each bottle 100, 110 are externally threaded and are configured to receive complimentary internally threaded portions of caps 102, 112. The caps 100, 112 are configured to be placed on the respective bottles 100, 110 and each include a nipple 34 sized to be received by the inlet in the end cap 18. Each of the nipples 34 includes an internal valve that is configured to open when the nipple is inserted into the inlet of the end cap 18 and downward pressure is applied. In connection with this, the end cap 18 may also be configured with a one-way check valve enabling liquid to enter the bladder through the end cap 18 but not exit.

In order to fill the bladder 12 of the device 12, a user may simply insert the nipple 34 of one of the bottles 100, 110 into inlet in the end cap 18. Downward pressure on the bottle 100 or 110 causes the internal valve to open, allowing the liquid scent within the bottle to pass through the end cap 18 and fill the bladder.

Operation of the device 12 will now be discussed in connection with FIGS. 3 and 6-8. When it is desired to apply a scent trail such as, for example, when a hunter is traveling to a hunting stand or the like, a user may first unscrew the cap 22 from the coupling 24 on the end of the tube 16. The cap 22 may then be screwed onto the male threaded stud 30 so that it isn't misplaced. The wick 20 may then be removed from the slot 28 and threaded onto the coupling 24 to attach it to the tube. The tube 16 may then be uncoiled in the manner discussed above such that the tube 16 is positioned in a fully extended orientation. As a user walks through the woods, the bladder 14 is held in the hand of a user so as to position the wick 20 to the side of the user. In this orientation, the wick 20 travels parallel to a user. To dispense scent, light hand pressure is applied to the bladder 14, causing the liquid scent to exit the bladder 14 and enter the tube 16, where it soaks the wick 20. Further hand pressure will cause a slow drip from the saturated wick 20. Alternatively, the wick 20 may simply be dragged along the ground to apply scent.

Importantly, the length of the tube 16 allows a user to selectively apply a scent trail five feet or more to the side of a users path of travel. This minimizes the likelihood of cross-contamination that is typically caused by applying scent directly behind a hunter, resulting the respective scents to be laid on top of one another. The device 12 of the present invention is therefore configured to apply a scent trail parallel to, but offset from, a user's path of travel. Due to the length of the tube 16 a user can apply scent up to 10 feet or more above the ground, which is simply not possible with existing systems and devices. In addition, the device 12 allows for the continuous dispensing and application of scent, until the bladder 14 requires refilling. This is in contrast to existing methods which typically require constant reapplication of liquid scent to rags that are dragged behind a user.

Figure 9:
FIG. 9 is a perspective view of the scent dispensing device of FIG. 2, illustrating a scent dripping mode of operation.

With reference to FIG. 9, once a user reaches his or her destination, the spring clip 27 can be utilized to hang the device 12 from the branch of the tree or the like. In this position, the device 12 functions as a scent dripper that slowly releases scent due to the force of gravity. Alternatively, the spring clip 27 can be used to hang the device 12 from a user's belt, either when not in use or when two free hands are needed. When a user is through using the device, the wick 20 may be unscrewed from the tube 16 and placed in the storing slot 28. The end cap 22 may then be removed from the stud 30 and screwed onto the tube 16 to prevent the flow of liquid scent from the device 12. The tube 16 can then be coiled and stowed in place utilizing the strap 26.

The present invention therefore provides for an on-demand scent dispensing device 12 that facilitates the creation of scent trails parallel to human travel, without human contact or contamination. The device 12 offers a user full control and consistence of where, when and how much scent is used, without having to stop to reapply. The device 12 is configured for use in almost any terrain and in any weather conditions. The design allows complete separation of the scent from the user, and allows for scent to be applied up to 10 feet or more above the ground. The refilling bottles permit easy replenishing of the scent within the device and further minimize contamination. These features permit the quick and easy application of scent, therefore maximizing hunting time.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An apparatus for dispensing scent, comprising:
a housing defining a bladder configured to hold a volume of liquid scent;
a flexible tube connected to said bladder, said flexible tube having a distal end opposite said bladder; and
a wick receivable on said distal end of said tube;
wherein said flexible tube is flexible enough so as to be positioned in a plurality of positions and rigid enough to maintain said plurality of positions;
wherein said plurality of positions include a coiled position and a straightened position, whereby in said straightened position said liquid scent can be dispensed laterally relative to a path of travel of a user.

2. The apparatus of claim 1, wherein:
said wick is removable from said distal end of said tube.

3. The apparatus of claim 2, further comprising:
an end cap receivable on said distal end of said tube when said wick is removed from said tube.

4. An apparatus for dispensing scent, comprising:
a housing defining a bladder configured to hold a volume of liquid scent;
a flexible tube connected to said bladder, said flexible tube having a distal end opposite said bladder;
a wick receivable on said distal end of said tube and being removable from said distal end of said tube;
an end cap receivable on said distal end of said tube when said wick is removed from said tube; and
a threaded stud connected to said housing, said stud being configured to receive said end cap thereon when said end cap is not received on said distal end of said tube.

5. The apparatus of claim 3, further comprising:
a slot formed in said housing, said housing being sized and shaped to receive said wick.

6. The apparatus of claim 3, further comprising:
a threaded coupling connected to said distal end of said tube, said coupling enabling connection of one of said wick and said end cap to said tube.

7. The apparatus of claim 6, wherein:
said wick includes a threaded portion for mating with a complimentary threaded portion of said coupling.

8. The apparatus of claim 1, wherein:
said bladder includes an inlet and an outlet;
wherein said flexible tube is fluidly coupled to said outlet.

9. The apparatus of claim 8, further comprising:
a cap configured to selectively close said inlet of said bladder.

10. The apparatus of claim 9, wherein:
said cap for closing said inlet of said bladder includes a one-way valve configured to permit said liquid scent to enter said bladder and prevent said liquid scent from exiting said bladder through said inlet.

11. The apparatus of claim 1, further comprising:
a flexible strap connected to said housing.

12. The apparatus of claim 1, further comprising:
a clip connected to said housing.

13. The apparatus of claim 8, further comprising:
a container containing said liquid scent engageable with said inlet of said bladder.

14. The apparatus of claim 1, further comprising:
a camouflage covering encasing said housing.

15. The apparatus of claim 1, wherein:
said flexible tube is approximately five feet in length to allow for dispensing of said liquid scent laterally and distal from a path of travel of a user.

16. The apparatus of claim 1, wherein:
said flexible tube includes a hollow plastic tube and a malleable metal wire;
wherein said malleable metal wire imparts a degree of stiffness to said hollow plastic tube.

* * * * *